United States Patent
Liu

(10) Patent No.: US 10,714,090 B2
(45) Date of Patent: Jul. 14, 2020

(54) VIRTUAL REALITY SPEECH CONTROL METHOD AND APPARATUS

(71) Applicant: BEIJING BAIDU NETCOM SCIENCE AND TECHNOLOGY CO., LTD., Beijing (CN)

(72) Inventor: Xiaoqian Liu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/783,344

(22) Filed: Oct. 13, 2017

(65) Prior Publication Data
US 2018/0108357 A1    Apr. 19, 2018

(30) Foreign Application Priority Data
Oct. 14, 2016    (CN) .......................... 2016 1 0900436

(51) Int. Cl.
G10L 15/26    (2006.01)
G06F 3/16    (2006.01)
G10L 15/22    (2006.01)

(52) U.S. Cl.
CPC ............ *G10L 15/265* (2013.01); *G06F 3/167* (2013.01); *G10L 15/22* (2013.01); *G10L 2015/223* (2013.01)

(58) Field of Classification Search
CPC . G10L 15/265; G10L 15/22; G10L 2015/223; G06F 3/167
See application file for complete search history.

(56) References Cited

U.S. PATENT DOCUMENTS 7,174,297 B2 * 2/2007 Guerra .................... G10L 15/30
                                                    704/270.1
8,985,442 B1 * 3/2015 Zhou ...................... G06Q 20/30
                                                    235/375
(Continued)

FOREIGN PATENT DOCUMENTS

CN    105009031 A    10/2015
CN    105183422 A    12/2015
(Continued)

OTHER PUBLICATIONS

Office Action issued in corresponding Chinese Application No. 201610900436.5 dated Mar. 22, 2019, and English translation thereof (19 pages).
(Continued)

*Primary Examiner* — Fariba Sirjani
(74) *Attorney, Agent, or Firm* — Osha Liang LLP

(57) ABSTRACT

A virtual reality speech control method and apparatus is provided in the present disclosure. The method includes: receiving a request for opening a speech interface from a VR application; opening a speech interface in response to the request and receiving input speech information through the speech interface; converting the speech information to text information, and normalizing the text information to generate an intent object in conformity with a preset specification; recognizing the intent object based on a preset specification set and acquiring an instruction corresponding to the intent object; sending the instruction to the VR application, such that the VR application executes the instruction and feeds back an execution result.

9 Claims, 6 Drawing Sheets

(56) References Cited

U.S. PATENT DOCUMENTS

| | | | |
|---|---|---|---|
| 9,285,589 B2* | 3/2016 | Osterhout | G02B 27/017 |
| 9,548,050 B2* | 1/2017 | Gruber | G06F 17/3087 |
| 2005/0251558 A1* | 11/2005 | Zaki | H04L 51/14 |
| | | | 709/206 |
| 2007/0282608 A1* | 12/2007 | Conkie | G10L 13/07 |
| | | | 704/260 |
| 2011/0035220 A1* | 2/2011 | Opaluch | G10L 15/265 |
| | | | 704/246 |
| 2011/0224981 A1* | 9/2011 | Miglietta | G10L 15/26 |
| | | | 704/235 |
| 2012/0245944 A1* | 9/2012 | Gruber | G10L 15/22 |
| | | | 704/270.1 |
| 2014/0237366 A1 | 8/2014 | Poulos et al. | |
| 2016/0180846 A1* | 6/2016 | Lee | G10L 15/22 |
| | | | 704/251 |
| 2017/0160813 A1* | 6/2017 | Divakaran | G06F 3/017 |
| 2017/0273549 A1* | 9/2017 | Nazareth | A61B 1/04 |
| 2017/0337035 A1* | 11/2017 | Choudhary | G06F 3/167 |
| 2017/0372703 A1* | 12/2017 | Sung | G10L 15/26 |
| 2018/0011534 A1* | 1/2018 | Poulos | G06F 3/013 |

FOREIGN PATENT DOCUMENTS

| | | |
|---|---|---|
| CN | 105450736 A | 3/2016 |
| CN | 105931645 A | 9/2016 |

OTHER PUBLICATIONS

Office Action issued in corresponding Chinese Application No. 201610900436.5 dated Oct. 14, 2019, and English translation thereof (16 pages).

* cited by examiner

VIRTUAL REALITY SPEECH CONTROL METHOD AND APPARATUS

This application is based on and claims priority to Chinese Patent Application No. 201610900436.5, filed on Oct. 14, 2016, the entire contents of which are incorporated herein by reference.

FIELD

The present disclosure relates to the field of virtual reality, and more particularly, to a virtual reality speech control method and apparatus.

BACKGROUND

Virtual Reality (VR) technology is a computer simulation system for realizing interactive three-dimensional dynamic scenes and entity behaviors, which is able to make real-time response according to a user behavior and feed back the response to the user, such that the user in the virtual world has a sense experience same with or similar to that in the real world.

In implements of virtual reality, there are two kinds of conventional control methods: one is to add a confirming point in a virtual reality image, movements of the confirming point may be controlled by rotations of the head of the user, so as to move the conforming point to a target position; the other method is to track gestures and movements of the user by a handle, a smart glove, an arm armor, an armor, and other wearable hardware devices, and to feed back an operating result through vibration so as to realize interactions between the user and the virtual reality environment. When the conventional control methods are used to realize interaction, in some simple scenarios, excessively repeated operations may be required, which is neither flexible nor convenient, and very easy to cause the user to feel fatigued, and thus both the reality and the interactive experience are poor.

SUMMARY

The present disclosure aims to solve at least one of the above technical problems to at least some extent.

Embodiments according to a first aspect of the present disclosure provide a VR speech control method, including: receiving a request for opening a speech interface from a VR application; opening the speech interface in response to the request and receiving input speech information through the speech interface; converting the speech information to text information, and normalizing the text information to generate an intent object in conformity with a preset specification; recognizing the intent object based on a preset specification set and acquiring an instruction corresponding to the intent object; sending the instruction to the VR application, such that the VR application executes the instruction and feeds back an execution result.

Embodiments according to a second aspect of the present disclosure provide a VR speech control apparatus, including: a receiving module, configured to receive a request for opening a speech interface sent from a VR application; a control module, configured to open the speech interface in response to the request and receive input speech information through the speech interface; a generating module, configured to convert the speech information to text information, and normalize the text information to generate an intent object in conformity with a preset specification; an acquiring module, configured to recognize the intent object based on the preset specification set, and acquire an instruction corresponding to the intent object; a sending module, configured to send the instruction to the VR application, such that the VR application executes the instruction and feeds back an execution result.

Embodiments according to a third aspect of the present disclosure provide a terminal, including: a processor; and a memory for storing instructions executable by the processor, wherein, the processor is configured to perform following actions:

receiving a request for opening a speech interface from a VR application;

opening the speech interface in response to the request and receiving input speech information through the speech interface;

converting the speech information to text information, and normalizing the text information to generate an intent object in accordance with a preset specification;

recognizing the intent object based on a preset specification set and acquiring an instruction corresponding to the intent object;

sending the instruction to the VR application, such that the VR application executes the instruction and feeds back an execution result.

Embodiments according to a fourth aspect of the present disclosure provide a non-transitory computer-readable storage medium configured to store one or more programs. When instructions stored in the storage medium are executed by a processor of a mobile terminal, the mobile terminal is caused to perform a VR speech control method, and the method includes:

receiving a request for opening a speech interface from a VR application;

opening the speech interface in response to the request and receiving input speech information through the speech interface;

converting the speech information to text information, and normalizing the text information to generate an intent object in accordance with a preset specification;

recognizing the intent object based on a preset specification set and acquiring an instruction corresponding to the intent object;

sending the instruction to the VR application, such that the VR application executes the instruction and feeds back an execution result.

With the present disclosure, the VR process and scenario change in the VR process can be controlled by speech, thus avoiding the inconvenience and repetitiveness of hardware control and improving the reality of the interaction.

BRIEF DESCRIPTION OF THE DRAWINGS

Above and/or other aspects and advantages of the present disclosure will become apparent and more easily to understand from the following descriptions of the embodiments of the present disclosure with reference to the drawings.

DETAILED DESCRIPTION

Figure 1:
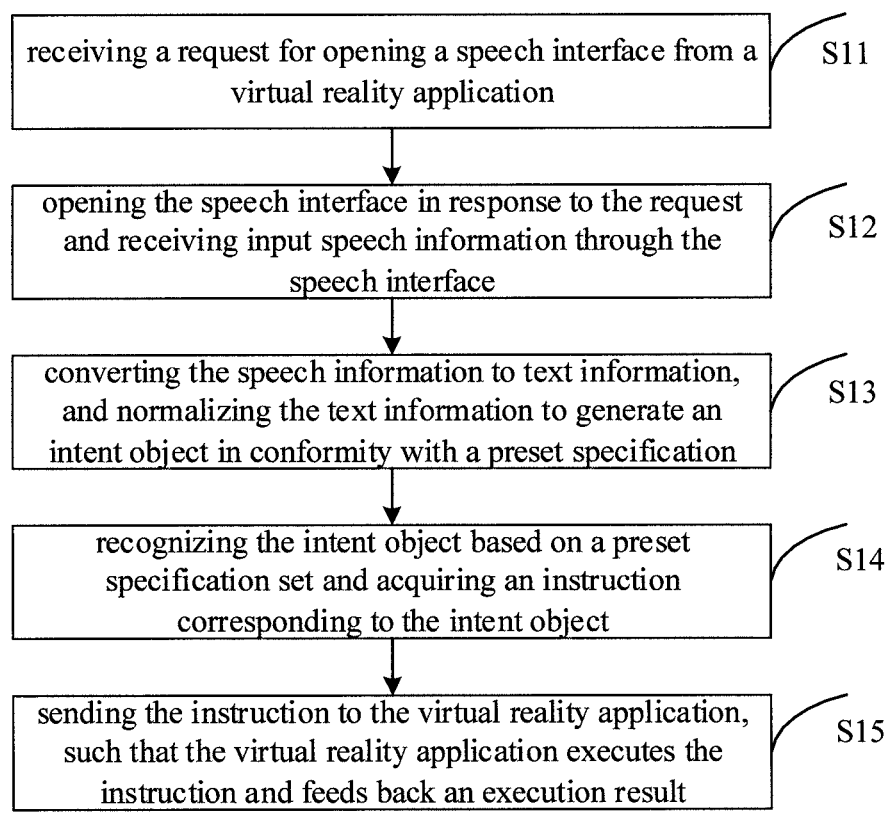
FIG. 1 is a flow chart showing a virtual reality speech control method according to an embodiment of the present disclosure.

Reference will now be made in detail to exemplary embodiments, examples of which are illustrated in the accompanying drawings, wherein the same or similar elements and the elements having same or similar functions are denoted by like reference numerals throughout the descriptions. Embodiments described herein with reference to drawings are explanatory and used to generally understand the present disclosure, and shall not be construed to limit the present disclosure. Instead, the embodiments of the present disclosure comprise all the variants, modifications and their equivalents within the spirit and scope of the present disclosure as defined by the claims.

FIG. 1 is a flow chart showing a virtual reality speech control method according to an embodiment of the present disclosure. The present embodiment is described on a Voice Control Virtual Reality System (VVRS) side. The VVRS is an application installed in a VR device with functions of speech recognition, semantic analysis, and speech synthesis, and is able to communicate with other virtual reality applications in the VR device. For example, VVRS may communicate with the virtual reality application for executing operation instructions.

As shown in FIG. 1, the virtual reality speech control method in the present embodiment includes following actions.

In block S11, a request from a VR application for opening a speech interface is received.

In this embodiment, when there is a need to input a speech instruction, the VR application sends, on its own initiative, a request for opening a speech interface to the VVSR installed in the VR device. The VVRS receives the request for opening a speech interface sent from the VR application.

In block S12, the speech interface is opened in response to the request and input speech information is received through the speech interface.

In this embodiment, when the VVRS receives the request for opening a speech interface sent from the VR application, it may open a speech interface and receive input speech information through the speech interface.

In detail, once the VVRS opens the speech interface in response to the request, it sends an instruction for turning on a microphone to the VR hardware device through the speech interface, such that VR hardware device turns on the microphone after receiving the instruction of opening the microphone and receives input speech information through the microphone. While the user inputs speech information via the microphone, the VR hardware device may receive the speech information through the microphone in real time and send the speech information to the VVRS. Then, the VVSR receives the input speech information through the speech interface.

In block S13, the speech information is converted to text information, and the text information is normalized to generate an intent object in conformity with a preset specification.

As described above, the VVSR has the function of speech recognition and semantic analysis. The speech information may be converted to text information by means of the speech recognition function of the VVRS. When the speech information is received through the speech interface, at the same time, the speech information can be recognized in time, and the received speech information is converted to text information. The text information generated after speech recognition or any other text information is then analyzed by means of the semantic analysis function of the VVRS, so as to obtain the intent object.

In this embodiment, during the process in which the speech interface of the VVRS receives the speech information input by the user, the VVRS may convert the speech information to text information in real time, normalize the text information, and finally generate the intent object in conformity with the preset specification.

It should be noted that the preset specification includes a plurality of different kinds of intent objects defined in advance.

In block S14, the intent object is recognized based on the preset specification set, and an instruction corresponding to the intent object is acquired.

In this embodiment, after the intent object in conformity with the preset specification is generated, the intent object is recognized based on the preset specification set, and then the instruction corresponding to the intent object is acquired. In detail, the instructions corresponding to intent objects include short commands and long commands, and the long commands include calling requests, sending a message, payment, searching for information, appointing events, and movement commands.

It should be noted that, the preset specification set is set in the VR device in advance, in which recognizable and normal event forms of the generated intent objects and the corresponding relationships between the intent objects and the instructions recognizable and executable by the VR application are stored. In the preset specification set, the intent objects are in one-to-one correspondence with the instructions, i.e., for each intent object, there is only one corresponding instruction.

Therefore, according to the one-to-one correspondence relationship between the intent objects and the instructions stored in the preset specification set, the instruction corresponding to the generated intent object may be acquired, that is, a short command or a long command corresponding to the generated intent object may be acquired. In detail, the long commands include calling request, sending a message, payment, searching for information, appointing events, and movement command.

In block S15, the instruction is sent to the VR application, such that the VR application executes the instruction and feeds back an execution result.

In this embodiment, after the VVRS acquires the instruction corresponding to the intent object, it sends the instruction to the VR application. The VR application receives the instruction sent from the VVRS, executes the instruction, and feeds back the execution result.

It should be noted that, according to different instructions, the execution results fed back are different. Examples are as follows.

Example one: the acquired instruction is a calling request. In detail, the calling request may be a speech calling request or a video calling request.

When the user wants to make a video call to Sam via the VR device, he/she may directly input speech information "make a video call to Sam". When the VVRS receives the speech information, the speech information is converted to text information, and the text information is normalized to obtain an intent object, then the intent object is recognized according to the preset specification set so as to acquire the corresponding instruction, i.e., the calling request in the long command, and the long command is sent to a corresponding VR application, i.e., a video call application. After the video call application receives the long command, the long command is executed and the execution result is fed back, i.e. a video call connection to Sam is initiated.

Example two: the acquired instruction is sending a message.

It should be understood that, for different VR applications which send the request for opening a speech interface, the messages to be sent may be of different types, for example, the message may be a QQ message, a Wechat message, a Wangwang message, or a short message.

When the user wants to send a short message to Sam via the VR device, he/she may directly input speech information "send a short message to Sam with the content of 'inform the department managers to have a meeting at 3 o'clock in the afternoon'". When the VVRS receives the speech information, the speech information is converted to text information, and the text information is normalized to obtain an intent object, then the intent object is recognized according to the preset specification set so as to acquire the corresponding instruction, i.e., sending a message in the long command, and the long command is sent to a corresponding VR application, i.e., an SMS (Short Message Service) application. After the SMS application receives the long command, the long command is executed and the execution result is fed back, i.e., a short message with the content of "inform the department managers to have a meeting at 3 o'clock in the afternoon" is edited and sent to Sam.

Example three: the acquired instruction is payment. In detail, ways of payment may include Alipay, Wechat, Mobile Banking Service or any other ways.

For example, when the user wants to pay 100$ for game props via Alipay while playing a game in a VR environment, he/she may directly input speech information "pay 100$ for game props via Alipay". When the VVRS receives the speech information, the speech information is converted to text information, and the text information is normalized to obtain an intent object, then the intent object is recognized according to the preset specification set so as to acquire the corresponding instruction, i.e., payment in the long command, and the long command is sent to a corresponding VR application, i.e. Alipay. After the Alipay application receives the long command, the long command is executed and the execution result is fed back, i.e. 100 $ is paid.

Figure 2:
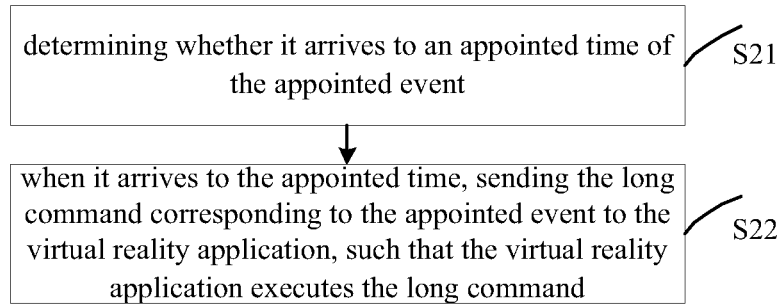
FIG. 2 is a flow chart illustrating a scenario in which a long command corresponding to an intent object is a prearranged event.

In addition, as shown in FIG. 2, when the acquired long command corresponding to the intent object is appointing an event, the method may also include following actions.

In block S21, it is determined whether it arrives to an appointed time of the appointed event. In this embodiment, after the intent object is recognized based on the preset specification set, and the instruction corresponding to the intent object is acquired, when the acquired instruction is appointing an event in long command, it needs to determine whether it arrives to the appointed time of the appointed event.

In block S22, when it arrives to the appointed time, the long command corresponding to the appointed event is sent to the VR application, such that the VR application executes the long command.

In this embodiment, when it is determined that it arrives to the appointed time of the appointed event, the long command corresponding to the appointed event is sent to the VR application, such that the VR application executes the long command. When it does not arrive to the appointed time, the VR application keeps waiting until the appointed time is arrived.

For example, the long command corresponding to appointing an event may include a set of intent events (for example, setting an alarm clock). For each intent event, it may include a set of objects, for example, when the intent event is to set an alarm clock, the objects may include time, repeat, content, etc. In detail, "time" represents the appointed time of the appointed event, "repeat" is a number of times of repeated reminding, and is configured to set a number of reminders and an interval between the reminders, "content" represents the content of the alarm clock. By using "domain" to indicate the long order, and taking the intent event of setting an alarm clock as an example, a detailed structure is as follows.

```
{
    domain:  appointing events
    intent:  set an alarm clock
    object: {
        time:
        repeat:
        content:
    }
}
```

During the interaction between the user and the VR device, when the user feels tired but cannot stop current activity immediately, a reminder for having a rest may be set, for example, the user may input speech information "remind me of having a rest 10 minutes later". The VVRS analyzes the speech information and acquires an intent object "to remind a rest 10 minutes later". The intent object is in conformity with a specification of an event appointment reminder in the preset specification set, and an instruction corresponding to the event appointment reminder may be acquired. In detail, the value of "time" is 10 minutes after the current time, and the value of "content" is "rest". When it arrives to the appointed time, a reminder in a form of speech or text will be sent to the user to remind him/her of having a rest.

With the VR speech control method according to embodiments of the present disclosure, the speech interface is opened in response to the request from the VR application, and input speech information is received through the speech interface, then the speech information is converted to text information, and the text information is normalized to generate the intent object, and after the instruction corresponding to the intent object is acquired, the instruction is sent to the VR application, such that the VR application executes the instruction and feeds back the execution result. In this way, the VR process and scenario change in the VR process can be controlled by speech, thus avoiding the inconvenience and repetitiveness of hardware control and improving the reality of the interaction.

Figure 3:
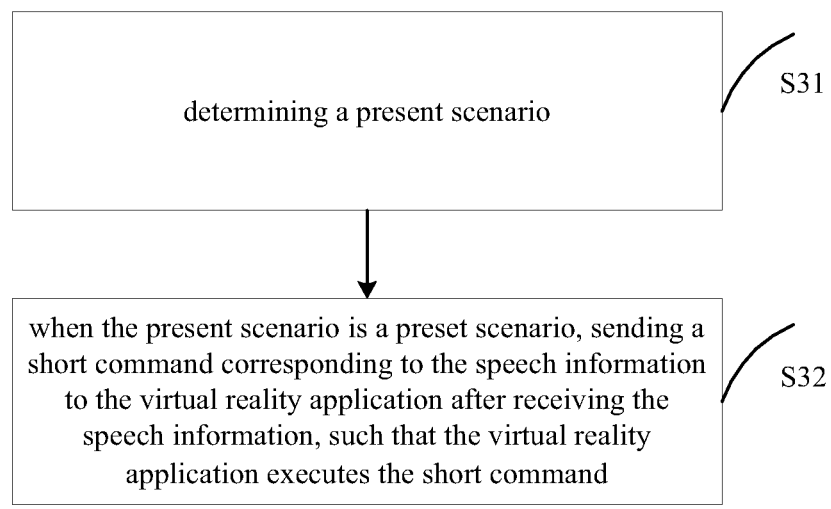
FIG. 3 is a flow chart showing a virtual reality speech control method according to another embodiment of the present disclosure.

FIG. 3 is a flow chart illustrating a VR speech control method according to another embodiment of the present disclosure.

In some embodiments, as shown in FIG. 3, the VR speech control method may further include following actions.

In block S31, a present scenario is determined.

In this embodiment, subsequent actions may be chosen after determining the present scenario. In block S32, when the present scenario is a preset scenario, a short command corresponding to the speech information is sent to the VR application after the speech information is received, such that the VR application executes the short command.

In this embodiment, when the present scenario is determined to be a preset scenario, after the speech information is received, the short command corresponding to the speech information is sent to the VR application, such that the VR application executes the short command.

In detail, the short command may include some simple word such as "OK", "begin", "stop", "no", and so on. The preset scenario may be a certain scenario in the VR environment where a required action may be achieved by a simple short command, for example, a scenario where the user is asked to confirm something or the user is asked whether to start or not. In embodiments of the present disclosure, the short commands and the preset scenarios may be set according to actual requirements, and are not limited here.

For example, during an interaction process between the user and the VR device, the present scenario is that the user sits in an airplane cockpit, and the user is asked to confirm whether to take off. In this case, when the user wants to fly the airplane, he/she merely needs to input simple speech information "OK" for completing the take-off operation of the airplane, without the need of operating hardware devices such as the hand shank by the user.

With the VR speech control method according to embodiments of the present disclosure, by determining the present scenario, and when the present scenario is a preset scenario, sending the short command corresponding to the speech information to the VR application after the speech information is received, the VR application can execute the short command, such that operations in the VR environment may be performed via speech conveniently and quickly, thus improving the reality of the interaction and improving the user experience.

Figure 4:
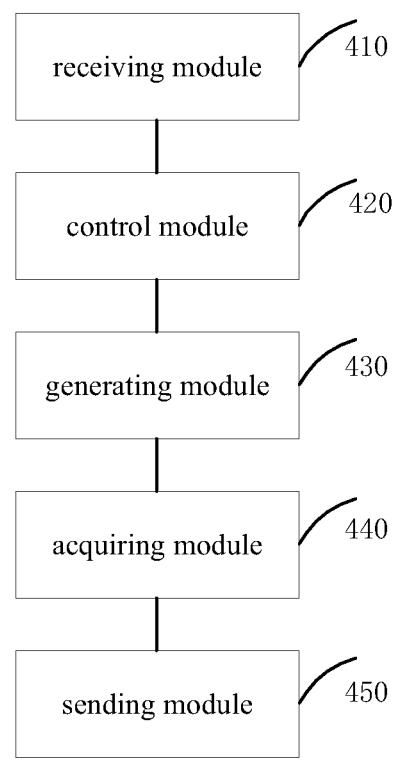
FIG. 4 is a block diagram illustrating a virtual reality speech control apparatus according to an embodiment of the present disclosure.

To achieve the above embodiments, the present disclosure also provides a VR speech control apparatus. FIG. 4 is a block diagram illustrating a VR speech control apparatus according to an embodiment of the present disclosure.

As shown in FIG. 4, the VR speech control apparatus according to the present embodiment includes a receiving module 410, a control module 420, a generating module 430, an acquiring module 440, and a sending module 450.

In detail, the receiving module 410 is configured to receive a request for opening a speech interface sent from a VR application.

The control module 420 is configured to open the speech interface in response to the request and receive input speech information through the speech interface.

In an embodiment, the control module 420 is configured to send an instruction for turning on a microphone to a VR hardware device through the speech interface, such that the VR hardware device turns on the microphone and receives input speech information through the microphone.

The generating module 430 is configured to convert the speech information to text information and normalize the text information to generate an intent object in conformity with a preset specification.

In detail, the instructions corresponding to the intent objects include short commands and long commands, and the long commands include calling request, sending a message, payment, searching for information, appointing events, and movement commands.

The acquiring module 440 is configured to recognize the intent object based on the preset specification set and acquire an instruction corresponding to the intent object.

The sending module 450 is configured to send the instruction to the VR application, such that the VR application executes the instruction and feeds back an execution result.

Figure 5:
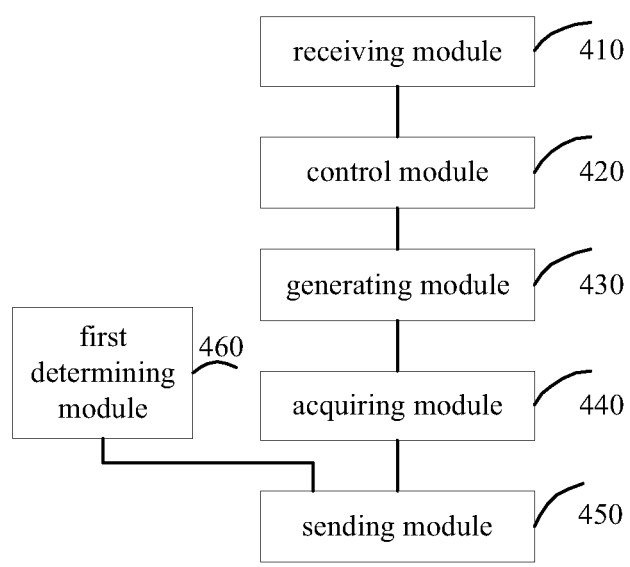
FIG. 5 is a block diagram illustrating a virtual reality speech control apparatus according to another embodiment of the present disclosure.

FIG. 5 is a block diagram illustrating a VR speech control apparatus according to another embodiment of the present disclosure.

Alternatively, in some embodiments, with reference to FIG. 5, the VR speech control apparatus may further include a first determining module 460.

The first determining module 460 is configured to determine a present scenario.

The sending module 450 is further configured to send a short command corresponding to the speech information to the VR application after the speech information is received, when the present scenario is a preset scenario, such that the VR application executes the short command.

Figure 6:
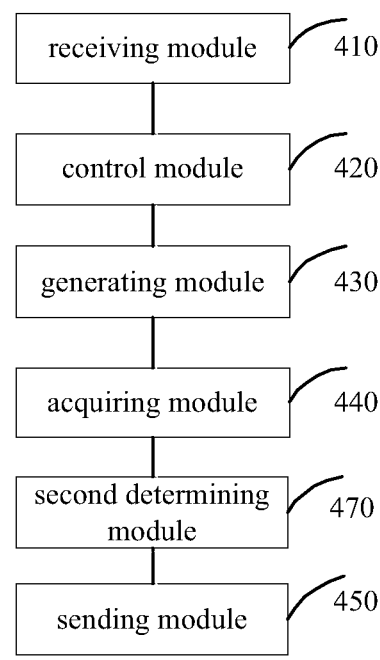
FIG. 6 is a block diagram illustrating a virtual reality speech control apparatus according to yet another embodiment of the present disclosure.

FIG. 6 is a block diagram illustrating a VR speech control apparatus according to yet another embodiment of the present disclosure.

Alternatively, in some embodiments, with reference to FIG. 6, the VR speech control apparatus may further include a second determining module 470.

The second determining module 470 is configured to determine whether it arrives to an appointed time of an appointed event when a long command corresponding to the speech information is appointing an event.

The sending module 450 is further configured to send the long command corresponding to the appointed event to the VR application when it arrives to the appointed time, such that the VR application executes the long command.

It should be understood that, the descriptions of the VR speech control methods in the above embodiments may also be applied to the VR speech control apparatus according to embodiments of the present disclosure, the principles of which are similar, and thus will not be elaborated here.

With the VR speech control apparatus according to embodiments of the present disclosure, the speech interface is opened in response to the request from the VR application, and input speech information is received through the speech interface, then the speech information is converted to text information, and the text information is normalized to generate the intent object, and after the instruction corresponding to the intent object is acquired, the instruction is sent to the VR application, such that the VR application executes the instruction and feeds back the execution result. In this way, the VR process and scenario change in the VR process can be controlled by speech, thus avoiding the inconvenience and repetitiveness of hardware control and improving the reality of the interaction.

To achieve the above embodiments, the present disclosure also provides a terminal. The terminal includes a processor and a memory for storing instructions executable by the processor, wherein, the processor is configured to perform following actions.

In block S11', a request from a VR application for opening a speech interface is received. In block S12', the speech interface is opened in response to the request and input speech information is received through the speech interface.

In block S13', the speech information is converted to text information, and the text information is normalized to generate an intent object in accordance with a preset specification.

In block S14', the intent object is recognized based on the preset specification set, and an instruction corresponding to the intent object is acquired.

In block S15', the instruction is sent to the VR application, such that the VR application executes the instruction and feeds back an execution result.

It should be understood that, the descriptions of the VR speech control method in the above embodiments may also be applied to the terminal according to embodiments of the present disclosure, principles of which are similar, and thus will not be elaborated here.

With the terminal according to embodiments of the present disclosure, the speech interface is opened in response to the request from the VR application, and input speech information is received through the speech interface, then the speech information is converted to text information, and the text information is normalized to generate the intent object, and after the instruction corresponding to the intent object is acquired, the instruction is sent to the VR application, such that the VR application executes the instruction and feeds back the execution result. In this way, the VR process and scenario change in the VR process can be controlled by speech, thus avoiding the inconvenience and repetitiveness of hardware control and improving the reality of the interaction.

To achieve the above embodiments, the present disclosure also provides a non-transitory computer readable storage medium configured to store one or more programs. When instructions stored in the storage medium is executed by a processor of terminal mobile terminal, the mobile terminal is caused to perform the VR speech control method according to embodiments of the first aspect of the present disclosure.

With the non-transitory computer readable storage medium according to embodiments of the present disclosure, the speech interface is opened in response to the request from the VR application, and input speech information is received through the speech interface, then the speech information is converted to text information, and the text information is normalized to generate the intent object, and after the instruction corresponding to the intent object is acquired, the instruction is sent to the VR application, such that the VR application executes the instruction and feeds back the execution result. In this way the VR process and scenario change in the VR process can be controlled by speech, thus avoiding the inconvenience and repetitiveness of hardware control, and improving the reality of the interaction.

To achieve the above embodiments, the present disclosure also provides a computer program product. When instructions stored in the computer program product is executed by a processor, the VR speech control method according to embodiments of the present disclosure is performed.

With the computer program product according to embodiments of the present disclosure, the speech interface is opened in response to the request from the VR application, and input speech information is received through the speech interface, then the speech information is converted to text information, and the text information is normalized to generate the intent object, and after the instruction corresponding to the intent object is acquired, the instruction is sent to the VR application, such that the VR application executes the instruction and feeds back the execution result. In this way, the VR process and scenario change in the VR process can be controlled by speech, thus avoiding the inconvenience and repetitiveness of hardware control and improving the reality of the interaction.

It should be noted that in the description of the present disclosure, terms such as "first" and "second" are used herein for purposes of description and are not intended to indicate or imply relative importance or significance or to imply the number of indicated technical features. In addition, in the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc. . . .

Those skilled in the art shall understand that all or parts of the steps in the above exemplifying method of the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. In addition, those skilled in the art could combine or associate different embodiments, examples or characters of different embodiments or examples, as long as there are no contradictories.

Although embodiments of present disclosure have been shown and described above, it should be understood that above embodiments are just explanatory, and cannot be construed to limit the present disclosure, for those skilled in the art, changes, alternatives, and modifications can be made in the embodiments without departing from spirit, principles, and scope of the present disclosure.

What is claimed is:

1. A virtual reality speech control method applicable to a virtual reality device, comprising:
receiving, by a first application, a request for opening a speech interface sent initiatively by a second application installed in the virtual reality device, wherein, the first application is a voice control virtual reality system installed in the virtual reality device, the second application is a virtual reality application and the virtual reality device comprises the first application, a plurality of second applications and a virtual reality hardware device;
opening, by the first application, the speech interface in response to the request and sending, by the first application, an instruction for turning on a microphone to the virtual reality hardware device through the speech interface, such that the virtual reality hardware device turns on the microphone and receives speech information through the microphone;
receiving, by the first application, the speech information sent by the virtual reality hardware device through the speech interface;
converting, by the first application, the speech information to text information, and normalizing, by the first application, the text information to generate an intent object in conformity with a preset specification, wherein the speech information comprises a long command for invoking a virtual reality application and corresponds to the generated intent object;
recognizing, by the first application, the intent object based on a preset specification set to acquire an instruction corresponding to the intent object, the preset specification set comprising intent objects and instructions, the intent objects having one-to-one correspondence with the instructions, wherein, the instruction corresponding to the intent object comprises short commands, wherein each of the short commands is denoted by one or two words and wherein a short command is capable of controlling execution operations across two or more virtual reality applications;
determining a present scenario; and
when the present scenario is a preset scenario, sending, by the first application, one short command from short commands corresponding to the speech information to the second application after receiving the speech information, such that the second application executes the short command and feeds back an execution result, in which, the preset scenario is a scenario in a virtual reality environment where an action is achieved by the short command from the short commands corresponding to the speech information.

2. The method according to claim 1, wherein the short commands include commands to start, stop, or confirm execution of the virtual reality application.

3. The method according to claim 1, wherein the long commands include calling requests, message sending, payment, information searching, appointing events, and movement commands.

4. The method according to claim 1, further comprising:
when the long command corresponding to the speech information is appointing an event, determining whether it arrives to an appointed time of the appointed event;
when it arrives to the appointed time, sending the long command corresponding to the appointed event to the second application, such that the second application executes the long command.

5. A virtual reality speech control apparatus applicable to a virtual reality device, comprising:
one or more processors; and
a memory, configured to store one or more software modules executable by the one or more processors,
wherein the one or more software modules comprises:
a receiving module, configured to receive a request for opening a speech interface sent initiatively by a second application installed in the virtual reality device, and to receive speech information sent by a virtual reality hardware device through the speech interface, wherein, the virtual reality device comprises a first application, a plurality of second applications and the virtual reality hardware device;
a control module, configured to open the speech interface in response to the request and receive the speech information through the speech interface, and to send an instruction for turning on a microphone to the virtual reality hardware device through the speech interface, such that the virtual reality hardware device turns on the microphone and receives the speech information through the microphone;
a generating module, configured to convert the speech information to text information, and normalize the text information to generate an intent object in conformity with a preset specification, wherein the speech information comprises a long command for invoking a virtual reality application and corresponds to the generated intent object;
an acquiring module, configured to recognize the intent object based on a preset specification set to acquire an instruction corresponding to the intent object, the preset specification set comprising intent objects and instructions, the intent objects having one-to-one correspondence with the instructions, wherein, the instruction corresponding to the intent object comprises short commands, wherein each of the short commands is denoted by one or two words and wherein a short command is capable of controlling execution operations across two or more virtual reality applications;
a first determining module, configured to determine a present scenario; and
a sending module, configured to, when the present scenario is a preset scenario, send one short command from the short commands corresponding to the speech information to the second application after receiving the speech information, such that the second application executes the short command and feeds back an execution result, in which, the preset scenario is a scenario in the VR environment where an action is achieved by the short command from the short commands corresponding to the speech information.

6. The apparatus according to claim 5, wherein the short commands include commands to start, stop, or confirm execution of the virtual reality application.

7. The apparatus according to claim 5, wherein, the long commands include calling requests, message sending, payment, information searching, appointing events, and movement commands.

8. The apparatus according to claim 5, further comprising:
a second determining module, configured to determine whether it arrives to an appointed time of an appointed event, when the long command corresponding to the speech information is appointing the event;

the sending module is further configured to send the long command corresponding to the appointed event to the second application when it arrives to the appointed time, such that the second application executes the long command.

9. A non-transitory computer-readable storage medium, configured to store one or more programs that, when executed by a processor of a terminal, cause the terminal to perform a virtual reality speech control method, the method comprising:

receiving, by a first application, a request for opening a speech interface sent initiatively by a second application installed in the virtual reality device, wherein, the first application is a voice control virtual reality system installed in the virtual reality device, the second application is a virtual reality application, and the virtual reality device comprises the first application, a plurality of second applications and a virtual reality hardware device;

opening, by the first application, the speech interface in response to the request and sending, by the first application, an instruction for turning on a microphone to the virtual reality hardware device through the speech interface, such that the virtual reality hardware device turns on the microphone and receives speech information through the microphone;

receiving, by the first application, the speech information sent by the virtual reality hardware device through the speech interface;

converting, by the first application, the speech information to text information, and normalizing the text information to generate an intent object in conformity with a preset specification, wherein the speech information comprises a long command for invoking a virtual reality application and corresponds to the generated intent object;

recognizing, by the first application, the intent object based on a preset specification set to acquire an instruction corresponding to the intent object, the preset specification set comprising intent objects and instructions, the intent objects having one-to-one correspondence with the instructions, wherein, the instruction corresponding to the intent object comprises short commands, wherein each of the short commands is denoted by one or two words and wherein a short command is capable of controlling execution operations across two or more virtual reality applications;

determining a present scenario; and when the present scenario is a preset scenario, sending, by the first application, one short command from short commands corresponding to the speech information to the second application after receiving the speech information, such that the second application executes the short command and feeds back an execution result, in which, the preset scenario is a scenario in a virtual reality environment where an action is achieved by the short command from the short commands corresponding to the speech information.

\* \* \* \* \*